United States Patent [19]

Addleman

[11] 4,127,633

[45] Nov. 28, 1978

[54] PROCESS FOR FABRICATING BIAXIALLY ORIENTED CONTAINER OF POLYETHYLENE TEREPHTHALATE COATED WITH A COPOLYMER OF VINYLIDENE CHLORIDE

[75] Inventor: Robert L. Addleman, Harpenden, England

[73] Assignee: Imperial Chemical Industries Limited, London, England

[21] Appl. No.: 784,631

[22] Filed: Apr. 4, 1977

[30] Foreign Application Priority Data

Apr. 21, 1976 [GB] United Kingdom ............... 16118/76
Jul. 28, 1976 [GB] United Kingdom ............... 31456/76
Feb. 11, 1977 [GB] United Kingdom ............... 5714/77

[51] Int. Cl.$^2$ ........................... B29C 17/07; B32B 1/10
[52] U.S. Cl. ........................................ 264/97; 264/98; 264/134; 427/307
[58] Field of Search ............... 264/89, 94, 96–99, 264/129, 134; 425/523; 427/171–173, 307; 428/483

[56] References Cited

U.S. PATENT DOCUMENTS

| | | | |
|---|---|---|---|
| 3,271,178 | 9/1966 | Nadeau et al. | 427/171 X |
| 3,403,042 | 9/1968 | Stead | 428/483 X |
| 3,449,479 | 6/1969 | Cines | 264/94 X |
| 3,468,994 | 9/1969 | Gilbert | 264/134 X |
| 3,489,601 | 1/1970 | Stapp et al. | 264/134 X |
| 3,600,208 | 8/1971 | Abbott et al. | 428/483 X |
| 3,662,053 | 5/1972 | Yoshikawa et al. | 264/129 |
| 3,821,349 | 6/1974 | Mozer | 264/99 X |

FOREIGN PATENT DOCUMENTS

| | | | |
|---|---|---|---|
| 697,148 | 11/1964 | Canada | 427/307 |
| 1,275,117 | 8/1964 | France | 427/307 |
| 1,107,957 | 3/1968 | United Kingdom | 427/307 |

*Primary Examiner*—Jan H. Silbaugh
*Attorney, Agent, or Firm*—Cushman, Darby & Cushman

[57] ABSTRACT

Polyethylene terephthalate preforms, for fabrication into containers such as bottles by blow moulding, are heated to 40° to 80° C prior to coating with an aqueous vinylidene chloride copolymer latex.

12 Claims, No Drawings

PROCESS FOR FABRICATING BIAXIALLY ORIENTED CONTAINER OF POLYETHYLENE TEREPHTHALATE COATED WITH A COPOLYMER OF VINYLIDENE CHLORIDE

This invention relates to a coating process and in particular to the application of a coating of a barrier material to a preform or parison that is subsequently to be fabricated into a container, such as a bottle, by a blow moulding process.

Polyethylene terephthalate hereinafter referred to as PET (by which term we include not only the homopolymer formed by the polycondensation of β-hydroxyethyl terephthalate but also copolyesters containing minor amounts of units derived from other glycols or diacids, e.g. isophthalate copolymers) is a particularly suitable material for fabrication into containers, such as bottles, by a blow moulding process wherein a preform is heated and stretched both axially and radially so as to confer biaxial orientation.

Such biaxially oriented PET containers are strong and have good resistance to creep. Hence containers of relatively thin wall, and hence light weight, can be produced that are capable of withstanding, without undue distortion over the desired shelf life, the pressures exerted by carbonated liquids, particularly beverages such as soft drinks, including colas, and beer.

However such thin walled PET containers are permeable to some extent to gases such as carbon dioxide and oxygen and hence permit loss of pressurising carbon dioxide and ingress of oxygen which may affect the flavour of the bottle contents. This is particularly important with some beverages and where the container is relatively small (as there the ratio of surface area of the container to contents volume is larger than with larger containers).

For this reason it is often desirable to provide the container with a layer of a barrier material which has a low vapour and gas permeability. Such layers may be provided by a variety of techniques, including coextrusion or overmoulding so as to form a laminar preform and coating the final container.

Such processes are however subject to various disadvantages. An alternative process is to make PET preforms and coat them with the barrier material prior to blow moulding. We have found however that it is difficult to obtain a coating of adequate thickness that does not present problems, e.g. delamination, in the subsequent handling and blow moulding operations.

We have now found that by heating the preform prior to coating, satisfactory coated blow moulded containers may be produced.

Accordingly we provide a process for the production of a biaxially oriented container from PET wherein a preform of PET in the amorphous state is stretched axially and radially in a blow moulding process into a container, in which the preform is heated to 40° to 80° C, coated with an aqueous dispersion of a vinylidene chloride copolymer, and dried, prior to blow moulding.

The coating is applied to the preform while the latter is at a temperature of 40° to 80° C, preferably 50° to 70° C. If the temperature is below 40° C, little advantage is obtained compared with coating a preform at room temperature where only a very thin coating, e.g. about 3 μm thickness, of insufficient adhesion is obtained. If the preform is heated to above 80° C, then crystallisation is likely to be induced which impairs satisfactory conversion of the preform into a biaxially oriented container during the blow moulding operation and also gives rise to distortion of the container as a result of uneven relaxation of moulding strains.

Notwithstanding the need to prevent an undue degree of bulk crystallisation in the preform which would be caused by heating, it can be beneficial to encourage surface crystallisation of the preform by pre-treatment with a suitable solvent, for example butanone (methyl ethyl ketone). Such treatment results in a surface roughness which aids the keying of subsequently applied coatings to the preform. The effect is directly proportional to both time and temperature of treatment, and with butanone for example a fine-scale (about 1 μm) roughness, associated with a well-developed spherulitic texture extending 30 to 50 μm inward from the surface, is obtained by treating the preform at 40° to 60° C for a period of 1 to 2 minutes.

Other solvents that may be used include acetone, chloroform, ethyl acetate, m-cresol and trichloroethylene.

By coating preforms heated to a temperature in the range 40 to 80° C an adherent and uniform coating of greater thickness, e.g. of the order of 20 to 30 μm may be produced in a single coating step. If this thickness coating is inadequate, the coated preform may be given further coats after drying to give the necessary thickness. Preferably the coated preform is reheated to 40 to 80° C before applying such further coats.

In order to avoid undue heating of the amorphous PET preform during the drying of the aqueous dispersion, which heating could give rise to development of crystallinity in the PET preform, the drying is preferably conducted using an infra-red heater operating at a temperature below 1000° C. At operating temperatures below 1000° C the radiation will be absorbed by the water in the aqueous dispersion without unduly heating the PET preform itself: the water thus tends to act as a filter against infra-red radiation.

During the drying step, the preform may be rotated so as to provide even heating and also to provide an even thickness coating. Thus a PET preform in the form of a tube having one closed end may be mounted with its longitudinal axis horizontal and rotated about this longitudinal axis.

As mentioned previously a plurality of coatings may be applied.

If desired multiple coatings may be applied continuously to the PET preform. Thus the preform may be mounted with its longitudinal axis horizontal and rotated about the longitudinal axis. As the preform rotates it is first heated by an infra-red heater to 40° to 80° C and then it picks up a coating of the aqueous dispersion from a coating point, e.g. a flexible doctor knife, then the water is evaporated off, and the coated preform heated to 40° to 80° C, by means of one or more infra-red heaters mounted adjacent the rotating preform so that the coating is dried and the preform reheated before one revolution of the preform is completed: hence on reaching the coating point on completion of one revolution, a further coating of the aqueous dispersion is applied over the dried coating. Thus a multilayer coating may be formed as a spiral on the preform.

The coating may be applied to the interior or exterior surface of the preform and may be applied by spraying or dip coating.

We have found coating the interior of the preform to be advantageous particularly where the resultant bottle is intended to contain carbonated beverages. Thus it presents a barrier layer between the beverage and bottle wall and so reduces the amount of carbon dioxide absorbed by the polyethylene terephthalate itself. This enables thinner coatings to be employed to achieve a specified carbon dioxide loss. Thus, in some cases it is possible to employ a coating on the interior of the preform of thickness only half that which would be required on the outside of the preform to give a similar carbon dioxide loss.

Furthermore, when used to make bottles for carbonated beverages, there is a tendency for the carbon dioxide diffusing through the bottle wall to cause an exterior coating to lose adhesion after a period of time giving rise to blisters. In contrast, a coating on the interior surface will be held firmly in place, even if the adhesion is lost for some reason, by the pressure of the carbonated liquid.

The vinylidene chloride copolymer dispersion may be any of those that are customarily employed for application of barrier coatings to plastic materials. Preferably it is an aqueous dispersion of a copolymer of vinylidene chloride with acrylonitrile and/or methyl acrylate optionally containing units derived from other monomers such as methyl methacrylate, vinyl chloride, acrylic acid or itaconic acid. Particularly useful vinylidene chloride copolymers are those containing 5 to 10% by weight of units derived from acrylonitrile and/or methyl acrylate, and optionally containing up to 10% by weight of units derived from an unsaturated carboxylic acid such as acrylic acid. The dispersions may preferably contain surfactants such as sodium alkyl sulphonates.

The preform may be made by any suitable technique such as injection moulding or extrusion.

The invention is illustrated by the following Examples wherein all percentages are exressed by weight.

EXAMPLE 1

An amorphous injection moulded preform 2 cm diameter, 7 cm long and 0.15 cm thick was made from polyethylene terephthalate homopolymer of inherent viscosity 0.75 dlg$^{-1}$ as measured at 25° C on a 1% solution in o-chlorophenol.

The preform was heated in an oven to 60° C and then dipped into an aqueous dispersion of a vinylidene chloride (92%)/methyl acrylate (8%) copolymer containing carboxyl groups derived from a trace of copolymerised acrylic acid. The dispersion had a solids content of 50% and contained a sodium alkyl sulphonate surfactant. The preform was dipped into the dispersion for 2 seconds and then dried with warm air. The resultant coating had a thickness of 20 μm.

The coated preform was then heated to 95° C and stretched longitudinally and radially in a blow moulding process to form a biaxially oriented bottle of 15 cm height and 6 cm maximum diameter and minimum wall thickness 0.015 cm.

The preform could be handled prior to blow moulding with no loss of the coating and there was no delamination of the coating on blow moulding.

EXAMPLE 2

By way of comparison Example 1 was repeated but the preform was at room temperature (20° C) when coated.

The resultant coating, which had a thickness of 3 μm, was poorly adherent and was readily delaminated and scuffed during handling and during the blow moulding process.

EXAMPLE 3

Example 1 was repeated but after drying the coated preform it was reheated to 60° C and a further coating of the vinylidene chloride copolymer applied by dip coating.

The resultant coated preforming had a coating thickness of 40 μm and could be carefully handled without delamination. The biaxially oriented bottle produced from the coated preform showed no signs of delamination.

EXAMPLE 4

Example 1 was repeated but instead of drying with warm air an infra-red heater operating below 1000° C was used to dry the coating prior to blow moulding.

I claim:

1. A process for the production of a coated, biaxially oriented container of polyethylene terephthalate comprising
   a. providing a container-preform of amorphous polyethylene terephthalate;
   b. heating said preform to a temperature of 40° to 80° C;
   c. while said preform is at a temperature of 40° to 80° C and while preventing undue bulk crystallization, applying to said preform a coating of an aqueous dispersion of a copolymer of vinylidene chloride and drying said coating on said preform; and
   d. stretching the dried coated preform axially and radially, in a blow molding process, at a temperature suitable for orientation, into a container.

2. A process according to claim 1 wherein said temperature ranges from 50° to 70° C.

3. A process according to claim 1 wherein, prior to applying said coating, the preform is treated with a solvent that induces crystallisation of the surface of the preform.

4. A process according to claim 3 wherein the preform is treated with ethyl methyl ketone at 40° to 60° C for 1 to 2 minutes.

5. A process according to claim 1 wherein the surface of the preform prior to coating has a spherulitic texture extending between 30 and 50 μm inward from the preform surface.

6. A process according to claim 1 wherein the coating is applied to the interior surface of the preform.

7. A process according to claim 1 wherein the vinylidene chloride copolymer is a copolymer of vinylidene chloride and at least one monomer selected from the group consisting of acrylonitrile and methyl acrylate.

8. A process according to claim 1 wherein the copolymer contains 5 to 10% by weight of acrylonitrile, methyl acrylate or mixtures thereof.

9. A process according to claim 8 wherein the copolymer also contains up to 10% by weight of units derived from an unsaturated carboxylic acid.

10. A process according to claim 1, wherein said copolymer contains at least one monomer selected from the group consisting of acrylonitrile, methyl acrylate, and an unsaturated carboxylic acid, said copolymer containing 5 to 10% by weight of acrylonitrile, methyl acrylate or mixtures thereof and 0 to 10% by weight of the unsaturated acid.

11. A process according to claim 10, wherein said temperature ranges between 50° to 70° C.

12. A process according to claim 1, wherein more than one coating of said aqueous dispersion is applied to said preform; wherein each coating is dried after each application thereof; and wherein said preform is heated to 40° to 80° C prior to application of each coating, in accordance with (b) and (c).

* * * * *